United States Patent Office 2,715,820
Patented Aug. 23, 1955

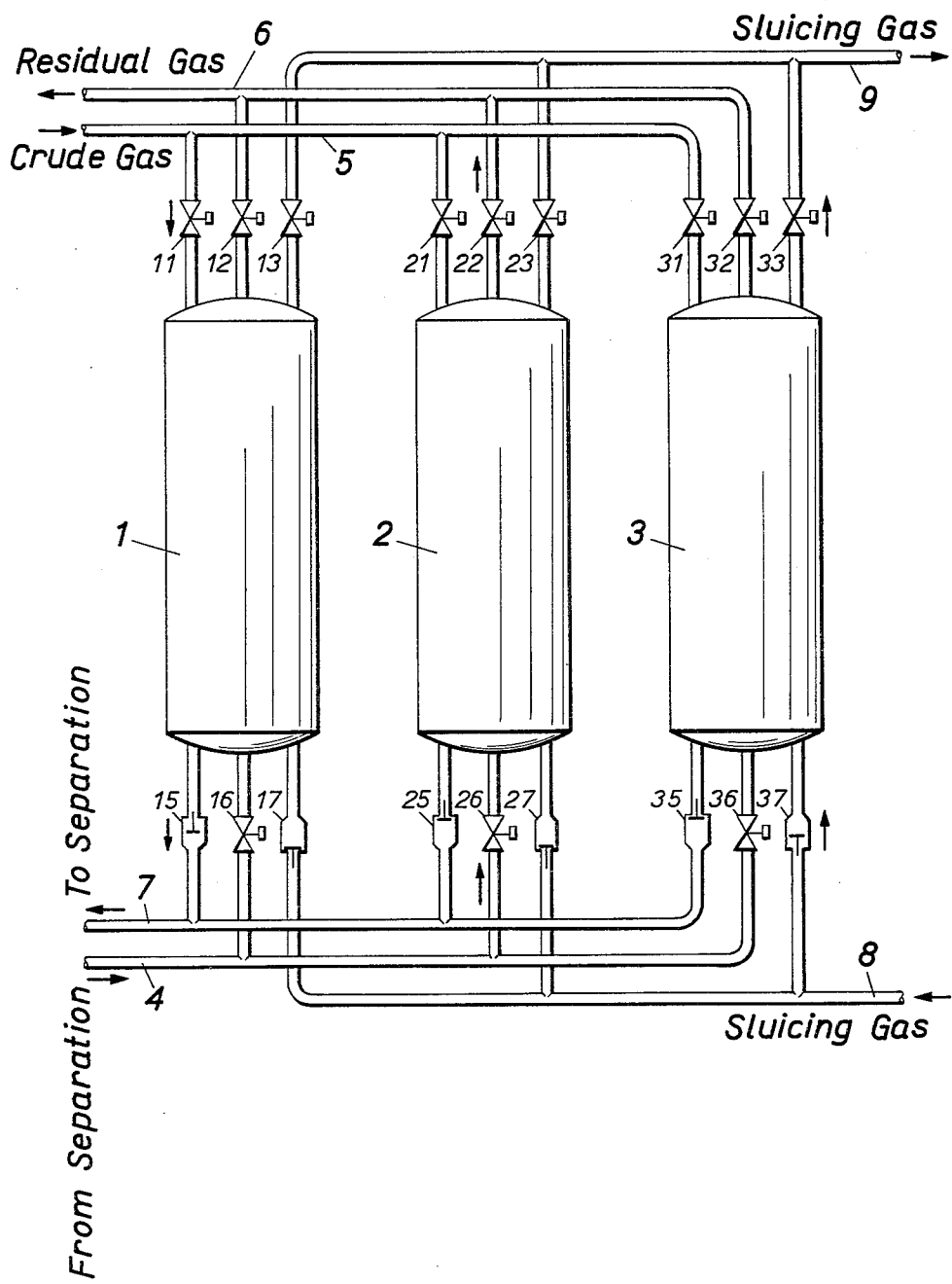

2,715,820

METHOD FOR THE SEPARATION OF GAS MIXTURES

Rudolf Becker, Munich-Solln, Germany

Application October 25, 1951, Serial No. 253,020

Claims priority, application Germany November 30, 1950

3 Claims. (Cl. 62—175.5)

The invention relates to the purification of gases by deep cooling the same in regenerators.

The use of pairs of filler loaded deep cooled regenerators through which gas mixtures are alternatingly conducted in opposite directions or conducted in alternatingly opposite directions are generally known in the art. Uniformity of operation and a satisfactory removal of the impurities deposited from the gas mixture is their important requirement.

The operation of these regenerator pairs is based on the following principles.

The regenerators are charged with filler masses and the latter are heated during the so-called "hot period" by the initial gas mixture, these masses being maintained at a lower temperature as the gas, the latter being during the hot period conducted over the filler masses and cooled. During the "cold period" the filler masses are cooled by the purified residual gas and the thus separated impurities may be evaporated. Therefore, the regenerators are heated by the initial gas in the hot period and cooled during the cold period by the purified gas.

While maintaining during a normal operation an equal heat capacity of the inflowing initial and outflowing purified gas, an excess is required of the purified gas over the initial gas to completely evaporate and sublimate the impurities which have been separated from the gases in the filler masses.

The requirement can be met without difficulty, if the pressure of the initial gas is substantially higher than that of the purified gas.

Difficulties, however, arise if the pressure of the initial gas is only slightly higher than that of the purified gas.

It is a main object of this invention to enable the maintenance of satisfactory work of the regenerators, at a substantially equal pressure of the impure and of the purified gas as well as the use of a low pressure for the gas separation, whereby highly economical operating conditions result.

It is a further important object of the invention to fully preserve the advantages of the regenerator work in spite of the maintenance of only a small difference between the pressure of the impure gas and the purified gas.

In compliance with these objects, the invention comprises in a method for the purification of gases the steps of deep cooling in a purification set composed of at least three regenerators charged with a gas purification material, flowing the impure gas in one direction through one regenerator to remove the impurities by condensation simultaneously flowing deep-cooled pure gases in the opposite direction to the flow direction of said impure gas through a second regenerator, repeatedly changing- over said two gas flows from one to the other regenerator within equal time periods, flowing a sluicing gas at a rate, which is essentially smaller than the flow rate of the gas passed through each of said two other regenerators, from the cold end to the warm end of a third regenerator, changing- over the gas flow from said third regenerator to one of said first named two regenerators, operating the latter in the manner of said previous third regenerator and continuously repeating said change-over step through the entire set of said regenerator.

The term "purified gas" is here used to define the cold gas, which remains from the impure gas after separation of a major part of the impurities by deep-cooling; it has a slightly lower pressure than the impure gas. The additional gas used for sluicing purposes is denoted as the "sluicing gas"; this sluicing gas is deep-cooled, free of impurities and has a smaller pressure than the impure gas. The regenerators used in the performance of my invention should preferably have a high heat capacity.

From experience gained with the invention, it was found that a volume of sluicing gas amounting to at least 1.4 times that of the impure gas is required to secure a complete removal of the impurities by evaporation and/or sublimation while maintaining a temperature difference of 2° C. at the cold end of the regenerators.

If the temperature of the sluicing and of the purified gas is substantially the same, a proportion of the volumina of sluicing gas and impure gas of 1:1.5 is sufficient to remove the impurities and to maintain satisfactory temperature and evaporating conditions.

The invention enables the passage of the impure and of the purified gas through the regenerators at an equal pressure. Pressure losses during the reversal of the gas flows may be practically avoided or entirely eliminated, if the pressure in the two regenerators coupled for the passage of the impure and the purified gas flows is maintained at about atmospheric pressure.

The invention may also be carried out at a subatmospheric pressure, whereby the gas flow is effected by suction, the latter being preferably applied at the end of the gas flow through regenerators. This mode of operation is particularly recommended if the treated crude gas is entirely pressure-free or contains corrosive components, which attack the compressors.

During the short reversal periods, for instance, of about 2 to 30 minutes according to the invention, the impurities cannot be completely evaporated by the purified gas flow; this is only secured by the sluicing gas passed through a third further regenerator during the time of repeated reversal flows of the impure and the purified gas through the two regenerators. The sluicing gas is therefore only entered into the latter after the completion of a predetermined series of flow reversals of the impure and purified gases.

It is recommended to apply the cold sluicing gas prior to the purified gas period, since due to the small quantity of the same the evaporation and sublimation of the impurities takes place at a higher temperature than that of the preceding impure gas period.

A gas may be used for sluicing purposes, of which the temperature is higher than that of the residual gas; the quantity of the sluicing gas may be reduced thereby; in this case, the sluicing gas is passed through the regenerators as a sort of a "heat wave" shortly before the passage of the residual gas.

The invention is schematically illustrated in the accompanying drawing, showing a vertical section view of a set of three regenerators.

The numerals 1, 2 denote two regenerators, which in the shown phase of the operation, are to be reversed within short periods from coke gas to a substantially equal quantity of purified gas and vice versa, the gases being maintained at a substantially equal pressure. Numeral 3 denotes the third regenerator to be passed by the sluicing gas for a time which equals that of several, for instance, at least three reversal flows of the two other regenerators 1, 2.

Numerals 5, 7 denote the conduits for the flow of the coke oven gas, numerals 4, 6 for the flow of residual gas and numerals 8, 9 the flow of the sluicing gas; the numerals 15, 17, 25, 27, 35, 37 denote automatic check valves and the numerals 11, 12, 13, 16, 21, 22, 23, 26, 31, 32, 33, 36 the forcibly controlled change-over valves.

the word "up" the up flow direction of the gases; the filetters a–g denote the individual switching stages; the letters a. s. f. indicate that the process is further continued in the described manner.

| Regenerator | 1 | | 2 | | 3 | |
|---|---|---|---|---|---|---|
| Switching operation: | | | | | | |
| (a) | Crude | down | Rest | up | Sluice | up. |
| (b) | Rest | up | Crude | down | do | up. |
| (c) | Crude | down | Rest | up | do | up. |
| (d) | Sluice | up | Crude | down | Rest | up. |
| (e) | do | up | Rest | up | Crude | down. |
| (f) | do | up | Crude | down | Rest | up. |
| (g) | Rest | up | Sluice | up | Crude | down. |
| | a. s. f. | | a. s. f. | | a. s. f. | |

The automatic check valves 15, 17, 25, 27, 35, 37, and the change-over valves 16, 26, 36 are located at the cold end of the regenerators; the residual change-over valves are located at the upper end thereof.

The operation of the three regenerators in conformity with the invention will now be described.

5,000 cubic meters of coke gas having a normal temperature are conducted through conduit 5 and regenerator 1 by means of the change-over valve 11 and check valve 15, the regenerators being charged with a customary granular filler mass; the gas is cooled to −80° C. and thereby liberated from impurities, such as water vapor, heavy hydrocarbons and the like.

A slightly smaller quantity of about 4800 cubic meters purified gas, resulting from the purification of the coke gas by deep-cooling and having a temperature of −82° C. is passed at an equal pressure as the crude coke gas from conduit 4 into the second regenerator 2, the gas entering through reversing valve 26 and leaving at about normal temperature through valve 22 and conduit 26.

250 cubic meters of sluicing gas, which may have essentially the same temperature as the purified gas, are conducted without pressure from conduit 8 through valve 37 into the third regenerator 3 and therefrom through valve 33 into conduit 9 and discharged therefrom.

The switching scheme of the regenerators is performed as follows.

After a predetermined period of a few, for instance 2 to 6 minutes, the impure coke gas is switched from regenerator 1 to regenerator 2 and the purified gas from regenerator 2 to 1; the sluicing gas flows during this time through regenerator 3 without a directional change.

Hereupon the impure coke gas is switched to regenerator 1 and the purified gas to regenerator 2, whereas the flow of the sluicing gas through regenerator 3 remains unchanged. The sluicing gas is directed from regenerator 3 to the regenerator 1 only after a further switching of the impure and the purified gas; the coke gas is now directed into regenerator 2 and the purified gas into regenerator 3.

In conformity with a variation of the described operational sequence, the coke gas flow is first followed by a sluicing gas flow. In this case, the cooperation and sublimation takes place at a slightly higher medium temperature than the temperature of the impure gas. The regenerator is cooled in this case by the purified gas prior to the change-over to coke gas.

An example of the switching scheme is apparent from the following table, the flow reversal in the regenerators 1, 2 taking place after always three minutes. Regenerator 3 is passed during the various reversal periods by the sluicing gas.

Each horizontal row of the table indicates a switching operation; the word "crude" denotes the crude gas flow or heating period; the word "rest" the purified gas flow or cooling period; the word "sluice" the sluicing gas flow, the word "down" denotes the downflow direction and As previously mentioned, the switching of the sluicing gas into the regenerator, which has been previously passed by the impure coke gas takes place in accordance with this table after always three flow reversals of the impure and the purified gas prior to the passage of the latter through the regenerator and the cooling thereof. This switching scheme may, however, be modified and the sluicing gas may be switched over after 5 or 7 reversals.

Since certain changes in carrying out the above process could be made without departing from the scope thereof, it is intended that all matter contained in the above description or shown in the accompanying drawing shall be interpreted as illustrative and not in a limiting sense.

Having thus described the invention what I claim as new and desire to be secured by Letters Patent, is as follows:

1. In the method for the purification of gases the steps of deep cooling in a purification set composed of at least three regenerators charged with a gas purification material the step of flowing the impure gas in one direction through one regenerator to remove the impurities by condensation; simultaneously flowing deep-cooled pure gas in the opposite direction to the flow direction of said impure gas through a second regenerator, repeatedly changing-over said two gas flows from one to the other regenerator within equal time periods, flowing a sluicing gas at a rate, which is essentially smaller than the flow rate of the gas passed through each of said two other regenerators, from the cold end to the warm end of a third regenerator; changing-over the gas flow from said third regenerator to one of said first named two regenerators, operating the latter in the manner of said previous third regenerator and continuously repeating said change-over step through the entire set of said regenerators.

2. In a method according to claim 1 the step of performing the change-over from the third regenerator to the cooperating pair of the other two regenerators after a directional reversal of the gas flow in the said regenerator pair of 3 to 7 times.

3. In a method according to claim 1, controlling the amount of the gas flows in the third regenerator and in the cooperating pair of said two regenerators to correspond to the ratio of about 1:19.

References Cited in the file of this patent

UNITED STATES PATENTS

| | | |
|---|---|---|
| 1,402,340 | Burrell et al. | Jan. 3, 1922 |
| 1,533,716 | Voress et al. | Apr. 14, 1925 |
| 1,872,783 | Miller | Aug. 23, 1932 |
| 1,892,428 | Fonda | Dec. 27, 1932 |
| 1,998,774 | Bulkeley | Apr. 23, 1935 |
| 2,071,763 | Pollitzer | Feb. 23, 1937 |
| 2,089,558 | Karwat | Aug. 10, 1937 |
| 2,093,805 | De Baufre | Sept. 21, 1937 |
| 2,097,434 | De Baufre | Nov. 2, 1937 |
| 2,327,133 | Schuftan | Aug. 17, 1943 |